(12) United States Patent
Flygh et al.

(10) Patent No.: US 8,422,944 B2
(45) Date of Patent: Apr. 16, 2013

(54) PERSONAL FUNCTION PAD

(75) Inventors: Anders Flygh, Malmo (SE); Stefan Magnusson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 897 days.

(21) Appl. No.: 12/190,084

(22) Filed: Aug. 12, 2008

(65) Prior Publication Data
US 2010/0041332 A1 Feb. 18, 2010

(51) Int. Cl.
*H02J 7/00* (2006.01)

(52) U.S. Cl.
USPC ......... 455/41.1; 455/41.2; 455/418; 320/106; 320/108

(58) Field of Classification Search ............... 455/41.2, 455/41.3, 456.1, 517, 418, 425, 69; 320/106, 320/108, 115; 340/10.1, 10.52, 10.6; 345/169, 345/2.1; 705/35, 1.1
See application file for complete search history.

(56) References Cited

U.S. PATENT DOCUMENTS

| | | | |
|---|---|---|---|
| 7,580,678 B2 * | 8/2009 | Byman-Kivivuori et al. | 455/41.2 |
| 7,657,227 B2 * | 2/2010 | Doan et al. | 455/41.3 |
| 7,772,802 B2 * | 8/2010 | Manico et al. | 320/108 |
| 2004/0002305 A1 * | 1/2004 | Byman-Kivivuori et al. | 455/41.2 |
| 2006/0094412 A1 * | 5/2006 | Nonoyama et al. | 455/418 |
| 2007/0279002 A1 * | 12/2007 | Partovi | 320/115 |
| 2008/0030304 A1 * | 2/2008 | Doan et al. | 340/10.1 |
| 2008/0057876 A1 * | 3/2008 | Hsia et al. | 455/69 |
| 2008/0081608 A1 * | 4/2008 | Findikli et al. | 455/425 |
| 2008/0162312 A1 * | 7/2008 | Sklovsky et al. | 705/35 |
| 2008/0174405 A1 * | 7/2008 | Toorn | 340/10.1 |
| 2008/0258679 A1 * | 10/2008 | Manico et al. | 320/106 |
| 2009/0096413 A1 * | 4/2009 | Partovi et al. | 320/108 |

FOREIGN PATENT DOCUMENTS

| | | |
|---|---|---|
| EP | 1 761 093 A1 | 3/2007 |
| WO | WO 02/13555 A2 | 2/2002 |

OTHER PUBLICATIONS

Invitation to Pay Additional Fees and, Where Applicable, Protest Fee (10 pages) corresponding to International Application No. PCT/IB2009/050598; Mailing Date: Jun. 16, 2009.
Ortiz "An Introduction to Near Field Communication and the Contactless Communication API" http://java.sun.com/developer/technicalArticles/javame/nfc, Jun. 2008, pp. 1-12.
Wikipedia Encyclopedia, "Near Field Communication", http://en.wikipedia.org/wiki/Near_Field_Communication, downloaded Jul. 1, 2008, pp. 1-7.
Wikipedia Encyclopedia, "Radio Frequency Identification", http://en.wikipedia.prg/wiki/RFID, downloaded Jul. 21, 2008, pp. 1-31.
International Search Report and Written Opinion corresponding to International Application No. PCT/IB2009/050598, mailed Oct. 2, 2009.

* cited by examiner

*Primary Examiner* — April G Gonzales
(74) *Attorney, Agent, or Firm* — Myers Bigel Sibley & Sajovec, P.A.

(57) ABSTRACT

A personal function pad includes a surface that receives and supports a wireless terminal without making a direct electrical contact with the wireless terminal, and a near field communications (NFC) module that receives a first NFC signal from the wireless terminal and responsively transmits a second NFC signal to the wireless terminal. The second NFC signal modifies a setting and/or initiates a function of the wireless terminal. A wireless terminal according to some embodiments includes a controller and an NFC communications module. The NFC module transmits a first NFC signal and receives a second NFC signal in response to the first NFC signal. The controller modifies a device setting and/or to initiates a device function of the wireless terminal in response to the second NFC signal.

18 Claims, 6 Drawing Sheets

PERSONAL FUNCTION PAD

FIELD OF THE INVENTION

The present invention relates to portable electronic devices, and in particular to wireless communication devices and accessories therefor.

BACKGROUND

Near Field Communication (NFC) is a wireless communication technology that enables short-range communications between closely-positioned wireless devices. NFC operates at a frequency of 13.56 MHz, which, in many countries, falls in an unlicensed ISM (industrial, scientific, medical) frequency range. The 13.56 MHz ISM band is also used for Radio-frequency identification (RFID) applications, such as in systems compliant with the ISO/IEC 14443 standard. In fact, NFC is an extension of the RFID standard, and defines additional communication modes beyond simple RFID mechanisms. Thus, an NFC device can communicate with other NFC devices in a peer-to-peer communication mode as well as with RFID devices in a read/write mode.

Like RFID, NFC uses magnetic field induction for communication. In magnetic field induction, two communicating devices each include loop antennas. When placed in close proximity (e.g. less than 20 cm), an electrical signal on one of the loop antennas can induce an electrical signal in the other of the loop antennas, thus providing a communication path between the devices.

Generally, NFC devices can be designed communicate in a passive mode and/or an active mode. In the passive mode, the antenna of the NFC device "listens" for a 13.56 MHz signal and responds to the signal as a transponder, i.e., transmits a code in response to an interrogation signal. The NFC device may in some cases draw operating power from the electromagnetic field of the signal.

In an active mode, the NFC device may independently generate and transmit an electromagnetic signal, and subsequently listen for a response to the signal.

In the peer-to-peer communication mode, an NFC device can communicate and exchange data with another NFC device. In the read/write mode, an NFC device can read a passive device, such as an RFID tag. In either case, the NFC device may use a standard data exchange format, such as the NFC Data Exchange Format (NDEF). An NDEF message, which is the basic message format used for NFC, includes one or more NDEF records, each of which contains an NDEF payload of data.

SUMMARY

An electronic device according to some embodiments includes a surface configured to receive and support a wireless terminal without making a direct electrical contact with the wireless terminal, and a near field communications (NFC) module configured to receive a first NFC signal from the wireless terminal and to responsively transmit a second NFC signal to the wireless terminal in response to the first NFC signal. The second NFC signal modifies a setting and/or initiates a function of the wireless terminal. For example, the second NFC signal may instruct the wireless terminal to enter a silent mode in which a ringer of the wireless terminal is disabled.

The electronic device may further include a pad sized to receive a plurality of handheld wireless devices, wherein the surface is on the pad.

The NFC module may include an RFID tag that may be configured to transpond the second NFC signal in response to the first NFC signal. Furthermore, the NFC module may be configured to draw operating power from the first NFC signal.

In some embodiments, the wireless terminal may include a first wireless terminal, and the NFC module may be configured to receive the first NFC signal from the first wireless terminal and a third NFC signal from the second wireless terminal, and to transmit the second NFC signal to the first wireless terminal in response to the first NFC signal, and to transmit a fourth second NFC signal to the second wireless terminal in response to the third NFC signal. The fourth NFC signal modifies a setting and/or initiates a function of the second wireless terminal.

A wireless terminal according to some embodiments includes a controller and a near field communications (NFC) communications module coupled to the controller and operatively controlled by the controller. The NFC module is configured to transmit a first NFC signal and to receive a second NFC signal in response to the first NFC signal. The controller is configured to modify a device setting and/or to initiate a device function of the wireless terminal in response to the second NFC signal. For example, the controller may be configured to place the wireless terminal in a silent mode in which a ringer of the wireless terminal is silenced in response to the second NFC signal.

The controller may be configured to place the wireless terminal in the silent mode with respect to a first group of callers in response to the second NFC signal and to not place the wireless terminal in the silent mode with respect to a second group of callers in response to the second NFC signal. The controller may be configured to not disable an alarm in the silent mode.

The controller may be configured to cause the NFC module to establish a peer-to-peer NFC communication path with a further wireless terminal in response to receiving the second NFC signal.

In some embodiments, the controller may be configured to establish respective peer-to-peer NFC communication paths with a plurality of other wireless terminals in response to receiving the second NFC signal, and the controller may be configured to receive a user input selecting one of the plurality of other wireless terminals and to automatically synchronize a file with the selected wireless terminal over the respective peer-to-peer NFC communication path with the selected wireless terminal.

The controller may be configured to automatically synchronize a file with the further wireless terminal over the NFC communication path.

The wireless terminal may further include a Bluetooth communications module, and the controller may be configured to disable the Bluetooth communications module in response to the second NFC signal. In some embodiments, the wireless terminal may further include a cellular communications module, and the controller may be configured to disable the cellular communications module in response to the second NFC signal.

The wireless terminal may be configured to continually transmit the first NFC signal after modifying the device setting and/or initiating the device function, and the controller may be configured to return the device setting to a previous setting and/or to terminate the device function in response to not receiving the second NFC signal in response to the first NFC signal.

The wireless terminal may further include a global positioning system (GPS) module, and the controller may be configured to determine a GPS position of the wireless terminal and to transmit the GPS position of the wireless terminal to a remote device over a data communications network in response to receiving the second NFC signal.

The controller may be configured to initiate playback of an audio and/or video file in response to receiving the second NFC signal.

The controller may be configured to transmit a presence status to a remote server over a data communication network in response to receiving the second NFC signal.

An electronic device according to further embodiments includes a surface configured to receive and support a wireless terminal without making a direct electrical contact with the wireless terminal, and a near field communications (NFC) module configured to transmit an NFC signal to the wireless terminal on the surface. The NFC signal modifies a setting and/or initiates a function of the wireless terminal.

A wireless terminal according to further embodiments includes a controller, and a near field communications (NFC) communications module coupled to the controller and operatively controlled by the controller, wherein the NFC module is configured to receive an NFC signal, and wherein the controller is configured to operate in a first operational mode before receiving the second NFC signal and to operate in a second operational mode after receiving the second NFC signal, and to revert to the first operational mode after the second NFC signal is no longer received.

DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

The present invention now will be described more fully hereinafter with reference to the accompanying drawings, in which embodiments of the invention are shown. This invention should not be construed as limited to the embodiments set forth herein; rather, these embodiments are provided so that this disclosure will be thorough and complete, and will fully convey the scope of the invention to those skilled in the art. Like numbers refer to like elements throughout. Furthermore, the various features and regions illustrated in the figures are illustrated schematically. Accordingly, the present invention is not limited to the relative size and spacing illustrated in the accompanying figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Figure 1:
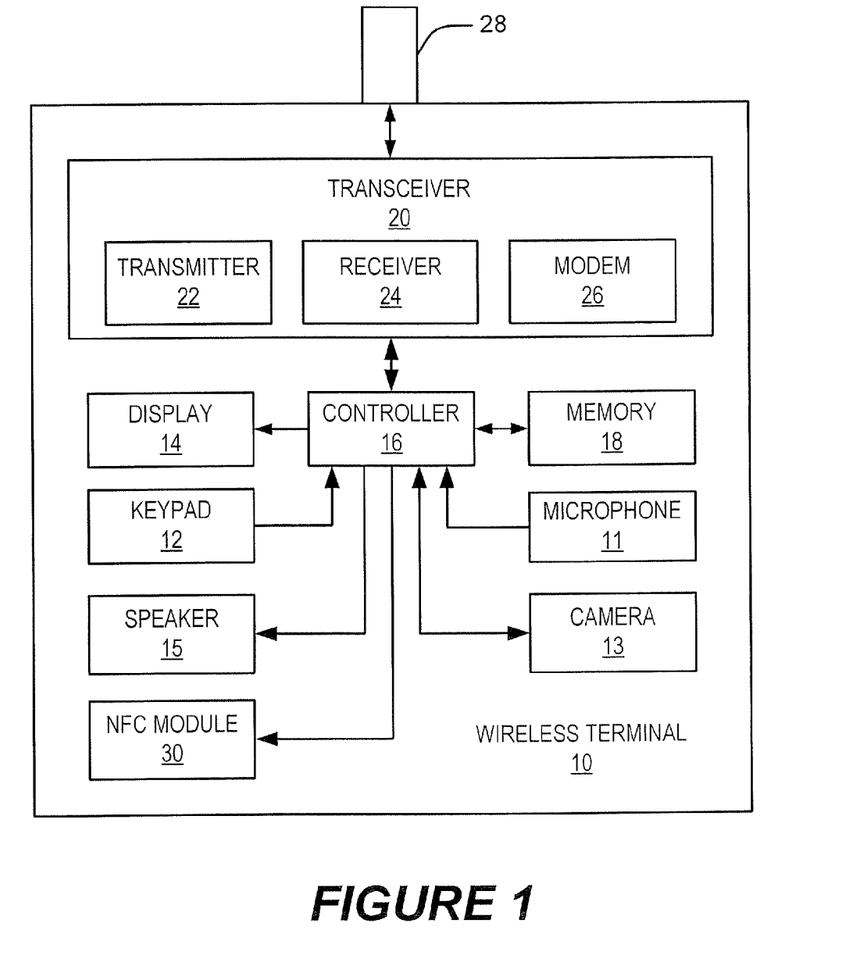
FIG. 1 is a schematic block diagram of a mobile telephone configured according to some embodiments.

A wireless terminal 10 according to some embodiments is illustrated in FIG. 1. As shown therein, an exemplary wireless terminal 10 may be a mobile telephone including a keypad 12, a display 14, a transceiver 20, a memory 18, a microphone 11, a speaker 15 and a camera 13 that communicate with a controller 16.

The controller 16 can include any standard low-power microprocessor and/or microcontroller used for mobile telephone applications. The controller 16 can include a signal processor and/or a signal processor can be provided as a separate component of the wireless terminal 10.

The transceiver 20 includes a transmitter circuit 22, a receiver circuit 24, and a modem 26, which cooperate to transmit and receive radio frequency signals to remote transceivers via an antenna 28. The radio frequency signals transmitted between the wireless terminal 10 and the remote transceivers may comprise both traffic and control signals (e.g., paging signals/messages for incoming calls), which are used to establish and maintain communication with another party or destination. With a cellular communication module, the wireless terminal 10 can communicate via base station(s) using one or more cellular communication protocols such as, for example, AMPS, ANSI-136, GSM, GPRS, EDGE, CDMA, wideband-CDMA, CDMA2000, and UMTS, The cellular base stations may be connected to a Mobile Telephone Switching Office (MTSO) wireless network, which, in turn, can be connected to a public switched telephone network (PSTN) and/or another network.

The memory 18 may be a general purpose memory that is used to store both program instructions for the processor 16 as well as data, such as audio data, video data, configuration data, and/or other data that may be accessed and/or used by the controller 16. The memory 18 may include a nonvolatile read/write memory, a read-only memory and/or a volatile read/write memory. In particular, the memory 18 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored. The memory 18 may include a removable nonvolatile memory card.

The wireless terminal 10 further includes a near-field communications (NFC) module 30 that is configured to operate in a peer-to-peer mode and/or in a read/write mode. Other modes of operation, such as card emulation mode, are possible. The NFC module 30 is operatively coupled to the controller 16 and can operate under the control of the controller 16.

Figure 2:
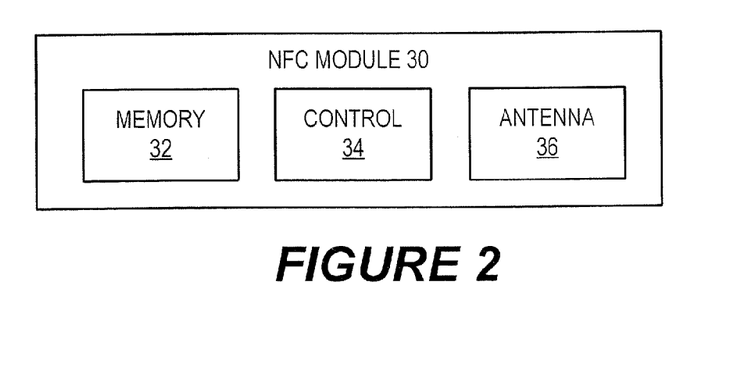
FIG. 2 is a schematic block diagram of a near field communications (NFC) module according to some embodiments.

An NFC module 30 is illustrated in more detail in FIG. 2. As shown therein, the NFC module 30 can include an antenna 36, a control circuit 34 and an optional memory 32. The antenna may include a loop antenna that is tuned to transmit/receive electromagnetic signals at a frequency of 13.56 MHz. The control circuit 34 controls operation of the NFC module, and can include a microprocessor or other control circuitry. The optional memory 32 can store data and/or settings used by the control circuit 34 in performing NFC communications. The control circuit 34 can operate in response to instructions from the controller 16 of the wireless terminal 10. In particular, the controller 16 of the wireless terminal 10 can execute a communication API (application programming interface) that controls operation of the NFC module 30. The communication API permits application programs executing on the wireless terminal 10 to query and exchange data with other NFC-enabled devices according to one or more of the NFC operational modes described above, such as read/write mode and peer-to-peer mode.

Figure 3A:
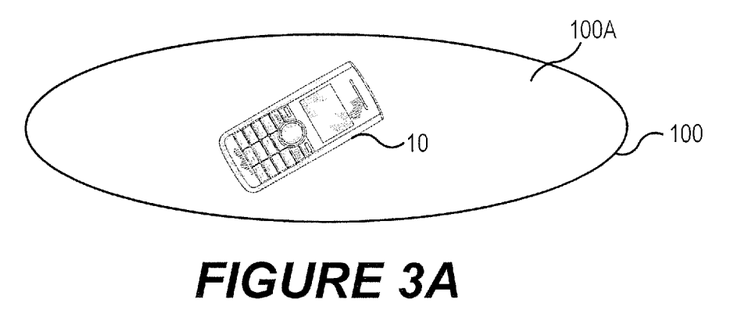
FIGS. 3A and 3B illustrate a personal function pad according to some embodiments.
Figure 3B:
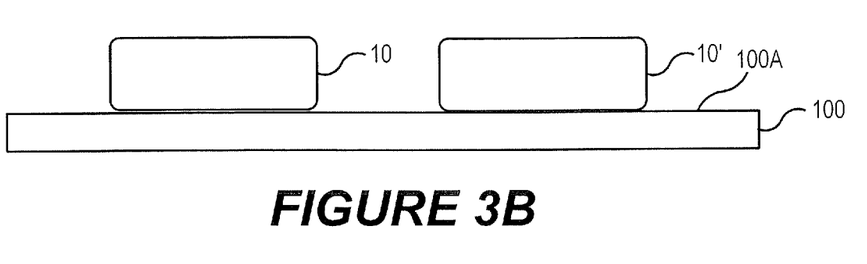

A personal function pad 100 according to some embodiments is illustrated in FIGS. 3A (in perspective view) and 3B (in side view). As shown therein, a personal function pad 100 is an electronic device that includes a surface 100A that is configured to receive and support one or more wireless terminals 10 without making a direct electrical contact with the wireless terminals 10. As shown in FIG. 3B, the surface 100A of the personal function pad 100 may be large enough to support multiple wireless terminals 10, 10'.

Figure 4A:
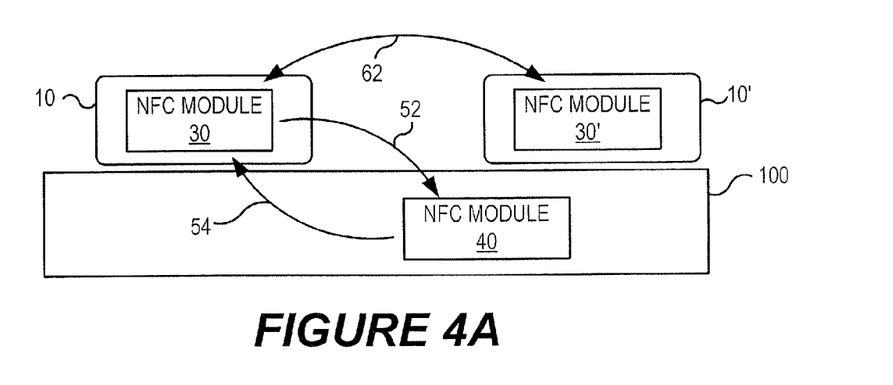
FIGS. 4A, 4B and 4C are schematic block diagrams that illustrate personal function pads according to some embodiments.
Figure 4B:
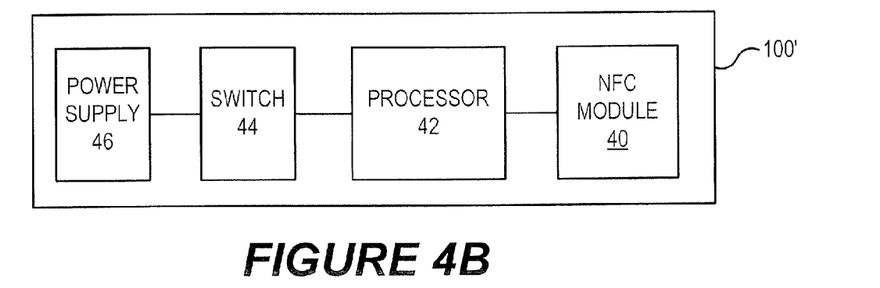
Figure 4C:
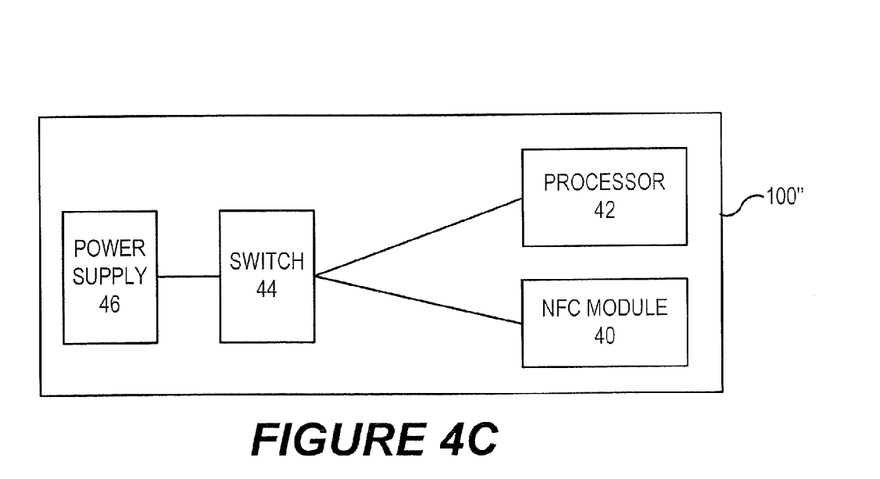

FIGS. 4A to 4C are block diagrams illustrating personal function pads 100, 100' and 100" according to various embodiments of the invention. Referring to FIGS. 3A, 3B and 4A to 4C, a personal function pad 100, 100', 100" includes a near field communications (NFC) module 40 that is configured to receive a first NFC signal 52 from the wireless terminal 10 and to responsively transmit a second NFC signal 54 to the wireless terminal 10 in response to the first NFC signal 52 when the wireless terminal 10 is brought into proximity with the personal function pad 100, 100', 100". In some embodiments, the second NFC signal 54 is a modified, transponded version of the first NFC signal 52. For example, the second NFC signal 54 may include additional information, such as a code and/or an instruction, in an NDEF message that can be interpreted by the wireless terminal 10.

The second NFC signal 54 transmitted by the personal function pad 100, 100', 100" causes the wireless terminal 10 to modify a setting and/or initiate a function in the wireless terminal 10. In some embodiments, the second NFC signal 54 may be transmitted continuously or continually while the personal function pad 100, 100', 100" is powered on, and is not transmitted in response to a first NFC signal 52 from the wireless terminal 10, as will be discussed in more detail below.

Referring to FIG. 4A, the personal function pad 100 may include only an NFC module 40 that is configured to operate in a passive mode. That is, the NFC module 40 may not have a separate power source, and may therefore operate using power derived from the first NFC signal 52 transmitted by the wireless terminal 10. In some embodiments, the NFC module 40 in the personal function pad 100 can include an RFID tag that complies with ISO/IEC 14443.

Referring to FIGS. 4B and 4C, the personal function pad 100', 100" may include a power supply 46, a switch 44 and a processor 42 in addition to the NFC module 40. Other elements, such as a separate memory, may also be provided. In the embodiments illustrated in FIG. 4B, the power supply 46 is only used to power the processor 42, which controls operation of the NFC module 40. The switch 44, which causes power to be applied from the power supply 46 to the processor 42, may in some embodiments include a proximity sensor and/or pressure sensor that senses the presence of a wireless terminal 10 on the surface 100A. Accordingly, in some embodiments, the personal function pad 100', 100" may be switched on only when a device is placed on the pad 100', 100". In further embodiments, the switch 44 may also be operated in response to receiving an NFC signal via the NFC module 40. Thus, in order to conserve battery life, even if an object is placed on the surface 100A, the switch may disconnect power to the processor 42 if no NFC signal is received within a predetermined time.

In the embodiments illustrated in FIG. 4B, the NFC module 40 is not connected to the power supply 46, and therefore may draw operating power from a received NFC signal, even though the processor 42 is powered. Thus, the personal function pad 100' of FIG. 4B may operate only in a passive mode, although the operation of the NFC module 40 can be modified by the processor 42. As shown in the embodiments of FIG. 4C, the switch 44 may also connect the power supply 46 directly to the NFC module 40, which may allow the NFC module 40 to operate in an active mode in the personal function pad 100".

In some embodiments, the NFC signal 54 transmitted by the personal function pad 100 instructs the wireless terminal 10 to enter a silent mode in which a ringer and/or alarm of the wireless terminal 10 is disabled, so that while the wireless terminal 10 is on the personal function pad 100, the wireless terminal 10 will not activate a ringer or ring tone in response to a call received at the wireless terminal 10. In some embodiments, a ringer can be disabled, but an alarm in the wireless terminal 10 may remain enabled.

As an example, a personal function pad 100 can be placed on a conference room table in a meeting room. As each meeting attendee enters the room, he or she can place their mobile telephone on the personal function pad 100. Each mobile telephone may disable its ringer in response to the NFC signal transmitted by the personal function pad 100, thereby ensuring that the meeting will not be interrupted by a telephone call to one of the meeting attendees.

In some embodiments, the controller 16 can place the wireless terminal 10 in silent mode with respect to a first group of callers in response to the NFC signal 54 and not place the wireless terminal 10 in silent mode with respect to a second group of callers in response to the NFC signal 54. Thus, for example, a wireless terminal 10 placed on the personal function pad 100 may not ring in response to calls from callers in the first group, but would ring in response to calls from callers in the second group.

Accordingly, the personal function pad 100 may be configured to transmit a first NFC signal to a first wireless terminal 10 and a second NFC signal to a second wireless terminal 10'. Each of the wireless terminals 10, 10' can receive an NFC signal from the personal function pad 100 and responsively modify a setting and/or initiate a function, such as placing itself in a silent mode.

The wireless terminals 10, 10' can take other actions in response to the NFC signal 54 from the personal function pad 100. For example, in response to the NFC signal 54 from the personal function pad 100, the controller 16 of the wireless terminal 10 may be configured to cause the NFC module 30 to establish a peer-to-peer NFC communication path 62 with the NFC module 30' of the wireless terminal 10'. The wireless terminals 10, 10' may then perform any number of functions, such as synchronizing data, exchanging files, etc. Such synchronization can be performed automatically in response to establishing the peer-to-peer NFC communication path 62.

In some embodiments, the wireless terminal 10 may further include a Bluetooth communications module, and the controller 16 may be configured to disable the Bluetooth communications module in response to the NFC signal 54 from the personal function pad 100. Similarly, the controller 16 may be configured to disable the transceiver 20 in response to the NFC signal 54 from the personal function pad 100.

The wireless terminal 10 may further include a global positioning system (GPS) module, and the controller 16 may be configured to determine a GPS position of the wireless terminal 10 and to transmit the GPS position of the wireless terminal 10 to a remote device over a data communications network, such as the Internet, in response to receiving the NFC signal 54 from the personal function pad 100.

In further embodiments, the controller 16 may be configured to initiate playback of an audio and/or video file in response to receiving the NFC signal 54 from the personal function pad 100.

In still further embodiments, the controller 16 may be configured to transmit a presence status to a remote server over a data communication network, such as the Internet, in response to receiving the NFC signal 54 from the personal function pad 100. Presence status is maintained on a number of communications systems, such as instant messaging systems, so that other users can determine the status of a user with whom they may want to communicate. Presence information, such as user's presence state, is typically maintained on a remote server and is supplied to a select group of other users (i.e., "buddies") on a communications system. In response to the NFC signal 54, the controller 16 may cause a presence of "unavailable" or "busy," etc., to be transmitted to the remote server, so that, for example, other users will be able to recognize that the user of the wireless terminal 10 is not currently available to view or return an instant message.

In some embodiments, the controller 16 is configured to return a device setting that was modified in response to the NFC signal 54 to a previous setting and/or to terminate a device function that was initiated in response to the NFC signal 54 once the wireless terminal 10 has been removed from the personal function pad 100. For example, the personal function pad 100 may continually transmit the NFC signal 54, either on its own or in response to first NFC signals 52 from the wireless terminal 10. When the wireless terminal 10 is removed from the personal function pad 100 and is moved a sufficient distance (e.g. greater than 10 cm) from the personal function pad 100, then the wireless terminal 10 may no longer receive the NFC signal 54 from the personal function pad. In response to not receiving the NFC signal 54 from the personal function pad 100, the wireless terminal 10 may revert to the state it was in prior to being placed on the pad 100. For example, the wireless terminal 10 may turn its ringer back on.

As noted above, in some embodiments, the second NFC signal 54 may be transmitted by the personal function pad 100', 100" continuously or continually while the personal function pad 100', 100" is powered on, and is not necessarily transmitted in response to a first NFC signal 52 from the wireless terminal 10. In this sense, the personal function pad 100', 100", may act as a beacon, and the NFC signal 54 may be a unique beacon signal that is identifiable as being transmitted by a personal function pad 100. The wireless terminal 10 may look for the beacon signal using its NFC module 30, and modify a setting thereof and/or initiate a function thereof in response to receiving the beacon signal from the personal function pad 100.

Figure 5:
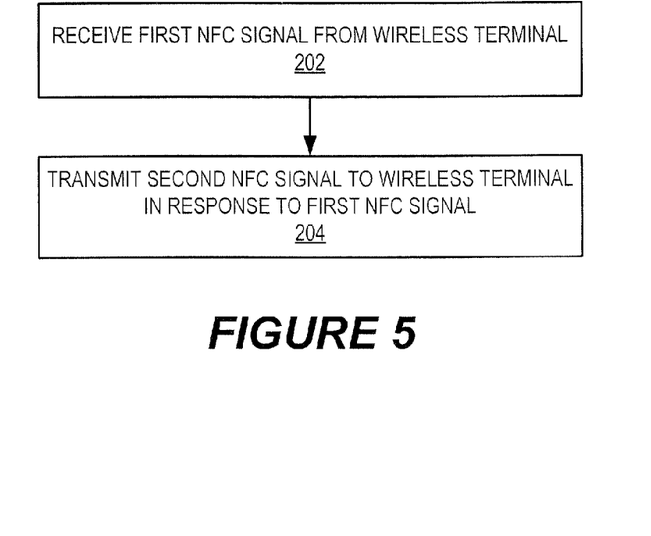
FIGS. 5, 6 and 7 are flowcharts illustrating devices and/or methods according to some embodiments.
Figure 6:
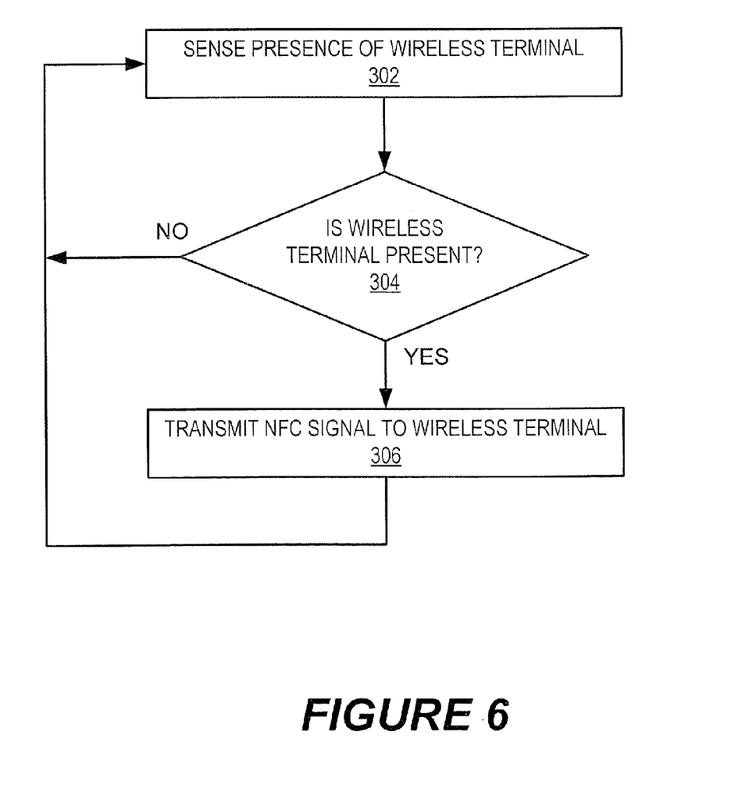
Figure 7:
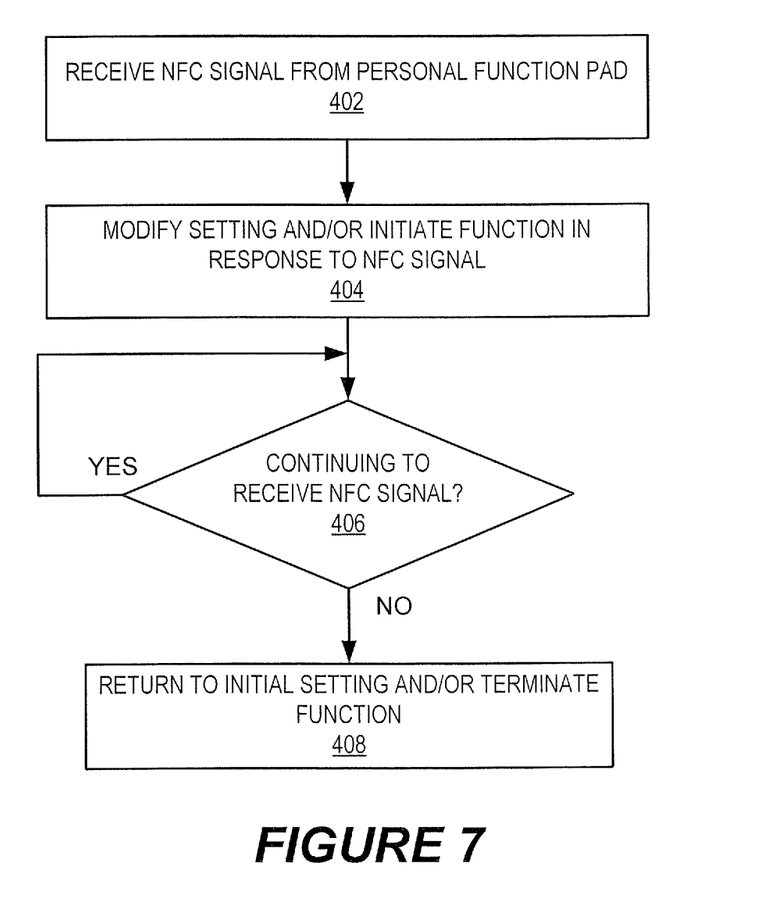

FIGS. 5-7 are flowcharts illustrating devices/methods according to some embodiments of the invention. In particular, FIG. 5 illustrates methods associated with a personal function pad 100 according to some embodiments. As shown therein, in some embodiments, a personal function pad 100 receives a first NFC signal 52 from a wireless terminal 10 (Block 202) and responsively transmits a second NFC signal 54 to the wireless terminal 10 (Block 204). The second NFC signal causes the wireless terminal 10 to modify a setting and/or initiate a function of the wireless terminal 10, such as causing the wireless terminal 10 to enter into a silent mode.

FIG. 6 illustrates methods associated with a personal function pad 100', 100" according to further embodiments. As illustrated therein, a personal function pad 100', 100" senses the presence of a wireless terminal 10 on the pad (Block 302). The presence of the wireless terminal 10 can be sensed in a number of ways, including receiving an NFC signal from the wireless terminal 10 and/or based on the state of a proximity sensor, such as a magnetic switch or a pressure switch. If the wireless terminal 10 is on the pad 100', 100" (Block 304), the personal function pad 100', 100" transmits an NFC signal to the wireless terminal 10. The NFC signal causes the wireless terminal 10 to modify a setting and/or initiate a function of the wireless terminal 10, such as causing the wireless terminal 10 to enter into a silent mode.

FIG. 7 illustrates operations of a wireless terminal 10 according to some embodiments. As shown therein, a wireless terminal 10 receives an NFC signal 54 from a personal function pad 100, 100', 100". The wireless terminal 10 modifies a setting thereof and/or initiates a function in response to the NFC signal 54 (Block 404). The wireless terminal 10 can continually check to see if it is continuing to receive the NFC signal 54 (Block 406). For example, the wireless terminal 10 can continually (i.e. from time to time) listen for the NFC signal 54 and/or interrogate the personal function pad with an NFC signal 52. If an NFC signal 54 is continuing to be received from the NFC pad 100, 100', 100", then the wireless terminal 10 can maintain the setting and/or function that was set/initiated in Block 404. Otherwise, the wireless terminal 10 may return the previously modified setting to an initial setting and/or terminate the function (Block 408).

Figure 8:
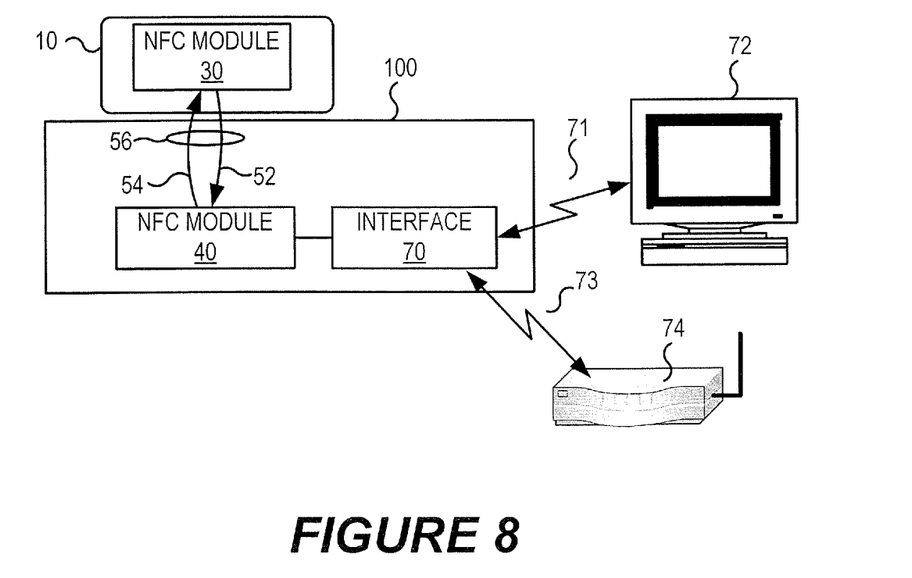
FIG. 8 is a schematic block diagram that illustrates personal function pads according to further embodiments.

FIG. 8 is a schematic block diagram that illustrates personal function pads according to further embodiments. As shown therein, a personal function pad 100 according to some embodiments includes an interface circuit 70 coupled to the NFC module 40. The interface circuit 70 enables communication between the NFC module 40 and an external device, such as a computer workstation 72 and/or a wireless router 74. Other external devices can be connected to the NFC module 74 through the interface circuit 70. The interface circuit 70 can enable wired and/or wireless communications in many different formats. For example, the interface circuit 70 can support wired connections such as USB and/or FireWire connections. The interface circuit 70 can additionally or alternatively support wireless connections, such as Bluetooth, Wi-Fi, GPRS, infrared, and others.

The NFC module 40 can communicate through the interface circuit 70 with one or more external devices to obtain data and/or settings that can be communicated to the wireless terminal 10 through the NFC communication path 56 established between the NFC module 40 in the pad 100 and the NFC module 30 in the wireless terminal 10. For example, when a wireless terminal 10 is placed on the pad 100 and establishes an NFC communication path 56 with the pad 100 using the NFC signals 52, 54 transmitted between the pad 100 and the wireless terminal 10, the wireless terminal 10 can use the communication path through the interface 70 to the external device 72, 74 to synchronize data (e.g. calendar, contacts, tasks, mail, etc.) with the external device 72, 74. The wireless terminal 10 can, in some embodiments, obtain configuration from the pad 100 that can be used to establish alternate communication paths with one or more external devices. For example, the wireless terminal 10 can obtain information from the pad 100 via the NFC communication path 56 regarding wireless settings for communicating wirelessly with the workstation 72, the router 74 and/or other devices using one or more wireless communication protocols.

As described herein, some embodiments of the present invention provide a personal function pad and/or a wireless terminal configured to communicate with a personal function pad via an NFC communication path. According to some embodiments, an operational mode of the wireless terminal is modified when the wireless terminal is placed on the personal function pad. The operational mode of the wireless terminal can be modified, for example, by changing at least one setting of the wireless terminal and/or initiating a device function of the wireless terminal, such as starting an application program, playing a song, communicating with a remote server, etc. When the wireless terminal is removed from the personal function pad, the NFC communication path is interrupted and the wireless terminal returns to its previous operational mode.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. An electronic device, comprising:
a surface configured to receive and support a wireless terminal without making a direct electrical contact with the wireless terminal;
a near field communications (NFC) module configured to receive a first NFC signal from the wireless terminal and to responsively transmit a second NFC signal to the wireless terminal in response to the first NFC signal, wherein the second NFC signal modifies a setting and/or initiates a function of the wireless terminal;
a processor coupled to the NFC module and configured to control operations of the NFC module;
a power supply; and
a switch configured to couple the power supply to the processor in response to detecting that an object has been placed on the surface, the switch further configured to disconnect power from the processor if no NFC signal is received by the NFC module within a predetermined period of time.

2. The electronic device of claim 1, further comprising a pad sized to receive a plurality of handheld wireless devices, wherein the surface is on the pad.

3. The electronic device of claim 1, wherein the second NFC signal instructs the wireless terminal to enter a silent mode in which a ringer of the wireless terminal is disabled.

4. The electronic device of claim 1, wherein the NFC module comprises an RFID tag that is configured to transpond the second NFC signal in response to the first NFC signal.

5. The electronic device of claim 1, wherein the NFC module is configured to draw operating power from the first NFC signal.

6. The electronic device of claim 1, wherein the wireless terminal comprises a first wireless terminal, and wherein the NFC module is configured to receive the first NFC signal from the first wireless terminal and a third NFC signal from a second wireless terminal, and to transmit the second NFC signal to the first wireless terminal in response to the first NFC signal, and to transmit a fourth NFC signal to the second wireless terminal in response to the third NFC signal, wherein the fourth NFC signal modifies a setting and/or initiates a function of the second wireless terminal.

7. A wireless terminal, comprising:
a controller; and
a near field communications (NFC) communications module coupled to the controller and operatively controlled by the controller;
wherein the NFC module is configured to transmit a first NFC signal and to receive a second NFC signal in response to the first NFC signal;
wherein the controller is configured to modify a device setting and/or to initiate a device function of the wireless terminal in response to the second NFC signal, and
wherein the controller is configured to cause the NFC module to establish a peer-to-peer NFC communication path with a further wireless terminal in response to receiving the second NFC signal.

8. The wireless terminal of claim 7, wherein the controller is configured to place the wireless terminal in a silent mode in which a ringer of the wireless terminal is silenced in response to the second NFC signal.

9. The wireless terminal of claim 8, wherein the controller is configured to place the wireless terminal in the silent mode with respect to a first group of callers in response to the second NFC signal without placing the wireless terminal in the silent mode with respect to a second group of callers.

10. The wireless terminal of claim 8, wherein the controller is configured to maintain an alarm function in the silent mode.

11. The wireless terminal of claim 7, wherein the controller is configured to automatically synchronize a file with the further wireless terminal over the NFC communication path in response to establishing the NFC communication path.

12. The wireless terminal of claim 11, wherein the controller is configured to establish respective peer-to-peer NFC communication paths with a plurality of other wireless terminals in response to receiving the second NFC signal, and wherein the controller is configured to receive a user input selecting one of the plurality of other wireless terminals and to automatically synchronize a file with the selected wireless terminal over the respective peer-to-peer NFC communication path with the selected wireless terminal.

13. The wireless terminal of claim 7, further comprising a Bluetooth communications module, wherein the controller is configured to disable the Bluetooth communications module in response to the second NFC signal.

14. The wireless terminal of claim 7, further comprising a cellular communications module, wherein the controller is configured to disable the cellular communications module in response to the second NFC signal.

15. The wireless terminal of claim 7, wherein the wireless terminal is configured to continually transmit the first NFC signal after modifying the device setting and/or initiating the device function, and wherein the controller is configured to return the device setting to a previous setting and/or to terminate the device function in response to not receiving the second NFC signal in response to the first NFC signal.

16. The wireless terminal of claim 7, further comprising a global positioning system (GPS) module, wherein the controller is configured to determine a GPS position of the wireless terminal and to transmit the GPS position of the wireless terminal to a remote device over a data communications network in response to receiving the second NFC signal.

17. The wireless terminal of claim 7, wherein the controller is configured to initiate playback of an audio and/or video file in response to receiving the second NFC signal.

18. The wireless terminal of claim 7, wherein the controller is configured to transmit a presence status to a remote server over a data communication network in response to receiving the second NFC signal.

* * * * *